United States Patent
Eyada

(10) Patent No.: US 9,762,537 B1
(45) Date of Patent: Sep. 12, 2017

(54) SECURE PATH SELECTION WITHIN COMPUTER NETWORKS

(75) Inventor: Hatem Eyada, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2140 days.

(21) Appl. No.: 12/251,018

(22) Filed: Oct. 14, 2008

(51) Int. Cl.
*H04L 29/06* (2006.01)

(52) U.S. Cl.
CPC ................. *H04L 63/0227* (2013.01)

(58) Field of Classification Search
CPC ..... H04L 65/1069; H04L 63/20; H04L 65/00; H04L 63/205; H04L 63/0227
USPC ............................................................ 726/1
See application file for complete search history.

(56) References Cited

U.S. PATENT DOCUMENTS

| | | | |
|---|---|---|---|
| 7,167,593 B2 | 1/2007 | Singh | |
| 7,403,487 B1 * | 7/2008 | Foladare et al. | 370/252 |
| 7,460,473 B1 | 12/2008 | Kodama et al. | |
| 7,486,659 B1 * | 2/2009 | Unbehagen et al. | 370/351 |
| 7,496,661 B1 * | 2/2009 | Morford et al. | 709/224 |
| 7,584,298 B2 * | 9/2009 | Klinker et al. | 709/238 |
| 7,869,355 B2 | 1/2011 | Kodama et al. | |
| 8,018,866 B1 * | 9/2011 | Kasturi et al. | 370/252 |
| 2004/0114595 A1 * | 6/2004 | Doukai | 370/389 |
| 2005/0152286 A1 * | 7/2005 | Betts et al. | 370/255 |
| 2006/0092974 A1 * | 5/2006 | Lakshman et al. | 370/469 |
| 2006/0092975 A1 * | 5/2006 | Ansari et al. | 370/469 |
| 2006/0168273 A1 * | 7/2006 | Michael | 709/230 |
| 2008/0112325 A1 * | 5/2008 | Sivakumar et al. | 370/238 |
| 2008/0165784 A1 | 7/2008 | Ko et al. | |
| 2009/0067440 A1 * | 3/2009 | Chadda et al. | 370/401 |
| 2009/0073884 A1 | 3/2009 | Kodama et al. | |
| 2009/0287968 A1 * | 11/2009 | Lee et al. | 714/699 |

OTHER PUBLICATIONS

U.S. Appl. No. 12/409,618, filed Mar. 24, 2009, entitled "Routing Protocol Extension for Network Acceleration Service-Aware Path Selection Within Computer Networks," Sravan Vadlakonda et al.
L. Berger et al., "The OSPF Opaque LSA Option," Network Working Group RFC 5250, Jul. 2008, 16 pgs.
"Application Flow Acceleration for Web (HTTP) Traffic," Juniper Networks, Inc., 2005, 8 pgs.
Notice of Allowance from U.S. Appl. No. 12/409,618, dated Sep. 29, 2011, 22 pp.

* cited by examiner

*Primary Examiner* — Tamara T Kyle
(74) *Attorney, Agent, or Firm* — Shumaker & Sieffert, P.A.

(57) ABSTRACT

In general, techniques are described by which a path through a network may be selected based on security information. For example, a network device may include one or more interfaces and a control unit. The interfaces may receive security information that describes a security service provided by a network security device. The network security device may couple to another network device. The control unit then determines, based on the security information, a path through the network that includes the other network device. The interfaces may forward at least a portion of the network traffic along the determined path to the other network device such that the network security device coupled to the other network device applies the security service to the portion of the network traffic forwarded via the path. As a result, the network device secures traffic by perform security path selection to forward traffic to network security devices.

33 Claims, 6 Drawing Sheets

SECURE PATH SELECTION WITHIN COMPUTER NETWORKS

TECHNICAL FIELD

The invention relates to computer networks and, more particularly, routing network traffic within computer networks.

BACKGROUND

A computer network typically includes a collection of interconnected computing devices that exchange data and share resources. The devices may include, for example, web servers, database servers, file servers, routers, printers, end-user computers and other devices. The variety of devices may execute a number of different services, operating systems (or operating system versions) and communication protocols. Each of the different services, operating systems and communication protocols may expose the network to different security vulnerabilities. A malicious user or "hacker" may exploit these security vulnerabilities to gain unauthorized access to, disrupt or generally attack the network.

In an attempt to prevent these network attacks, network administrators may deploy one or more network security devices, such as firewalls and Intrusion Detection/Prevention (IDP) devices, within the network to apply one or more security services, such as firewall, anti-virus and IDP services, that limit and/or even prevent these attacks. Often, the network administrators position at least one network security device behind each network device that resides at the edge of the network, such as behind each edge routers, to accommodate traffic engineering protocols, such as various link state protocols, that dynamically switch paths based on current link conditions within the network. Each of the one or more network security devices coupled to each edge router are then responsible for processing traffic for the corresponding edge router to which each network security device couples.

Upon receiving network traffic, these edge routers pass the traffic to the corresponding network security device located adjacent the edge device at the network entry point before selecting one or more paths for the traffic forwarding the traffic along paths through the network. These network security devices may then apply the above security services to respective network traffic entering the network through each edge router. If no attacks are detected, the network security device passes the network traffic back to the corresponding edge router, which in turn performs path selection and forwards the network traffic along the selected paths into the network. If, however, an attack is detected, the network security device denies the network traffic entry to the network by quarantining or dropping the network traffic. In this manner, the network security devices may reduce if not eliminate network attacks for each corresponding edge router by denying these attacks entry to the network. Thus, in such a conventional arrangement, application of security services is performed independent from path selection and routing of network traffic by each corresponding edge router. However, as network traffic increases service providers are forced to place additional security devices at heavy traffic locations within the network.

SUMMARY

In general, techniques are described by which routing devices within a network perform route resolution and path selection based on security information that describes the type of security services offered by network security devices deployed through the network, such as firewalls, Intrusion Detection Prevention (IDP) device and routers having integrated security devices. The secure path selection may be achieved by the routing devices first determining security information that describes the type of security services provided by each network security device within the network. Moreover, the routing devices may also determine the computing resources of the network security devices as well as the utilization of those resources as an indicator as to the available bandwidth the security devices may have.

Once determined, the routers may exchange the security information such that the router within the network maintains a database detailing security information for each network security device within the network. The collection of security information may be organized in the form of a security topology representing the interconnectivity of the security devices and their differing services relative to the network. Each router utilizes the database of security information and the defined security information topology when performing route resolution and selecting paths through the network along which to forward traffic. Based on the security topology, for example, each network device may select paths through the network that flow through particular network security devices so that the network security devices may apply corresponding security services to network traffic forwarded via that path. Moreover, the path selection may be based on the type of network services applied by the different security devices relative to the particular type of traffic being forwarded as well as the current utilization of the resources of each security device.

As a result, network administrators may more freely deploy network security devices within the network, as the routers (either dynamically or via administrator configuration) may perform traffic engineering based, not only on link connectivity information (e.g., link state or learned routes), but on the learned security information as well. Moreover, by utilizing security information during traffic engineering or path selection, the routers may more efficiently utilize network security devices by routing network traffic to under-utilized network security devices. Furthermore, the routers, again by virtue of utilizing security information during path selection, may select a path through multiple network security devices that provide different types of security services so as to layer application of two or more security services.

In operation, a network device (e.g., a layer three router) may comprise one or more interface by which to receive the security information advertisements from other peer devices (e.g., other layer three routers). Typically, the one or more interface receive the security information in accordance with a link state protocol, such as the Open Shortest Path First (OSPF) protocol. Moreover, the one or more interfaces may receive a Link State Advertisement (LSA) in accordance with the OSPF protocol that includes the security information. These LSAs may be referred to herein as a "security" LSA. This security information may be carried opaquely through the network such that only devices that support the secure path selection techniques may process the security information. Those network devices that do not support the secure path selection techniques may, in other words, ignore or otherwise forward the security LSA without processing the security information. As a result, the security LSA may comprise a class of LSAs referred to as an "opaque" LSA.

The network device may further comprise a control unit that includes a security module both for collecting security information concerning network security devices to which the network device couples (so-called adjacent network security devices) and for maintaining the security topology to reflect the received security information. The control unit may receive additional LSAs that define link characteristics and process these additional LSA in accordance with the link state protocol to maintain the network topology. The control unit may then select or determine a path through the network by overlaying the security topology on top of the network topology.

In other words, the control unit may determine, as part of the path selection processes, one or more security services to apply to particular portions of network traffic. The control unit may then determine, based on the security topology, one or more network security device that apply the determined one or more security services. The control unit may next, based on the network topology, determine a path through the determined one or more network security devices such that the portion of traffic may be forwarded along the path and the one or more determined network security devices may apply the identified one or more security services. After determining this path, the control unit may forward the portion of the network traffic via the path such that these one or more security services are applied to the network traffic, thereby securing the portion of the network traffic through secure path selection.

In one embodiment, a method comprises receiving, with a first router included within a network, security information that describes at least one security service provided by a network security device postitioned within the network, wherein the network security device is coupled to a second router different from the first router and based on both topology information describing the network and the received security information, performing path selection with the first router to determine a path through the network that includes the second router. The path includes a plurality of next hops from the first network router to a destination. The first router selects the path through the network so that the second router coupled to the network security device is positioned along the path between the first router and the destination. The method further comprises forwarding, with the first router, at least a portion of the network traffic along the determined path such that the network security device coupled to the second router along the path applies the security service to the portion of the network traffic forwarded via the path.

In another embodiment, a router included within a network comprises one or more interfaces that receive security information describing at least one security service provided by a network security device positioned within the network, wherein the network security device is coupled to another router different from the router and a control unit that, based on both topology information describing the network and the received security information, performs path selection to determine a path through the network that includes the other router. The path includes a plurality of next hops from the router to a destination. The control unit selects the path through the network so that the other router coupled to the network security device is positioned along the path between the router and the destination. The one or more interfaces further forward at least a portion of the network traffic along the determined path to the other router such that the network security device coupled to the other router applies the security service to the portion of the network traffic forwarded via the path.

In another embodiment, a network system comprises a plurality of network security device and a plurality of routers that couple to one or more of the network security devices. A first one of the plurality of network security devices includes one or more interfaces that receives security information describing at least one security service provided by each of the plurality of network security devices that couple to other ones of the plurality of routers different from the first one of the plurality of routers and a control unit that, based on both topology information describing the network and the received security information, performs path selection to determine a path through the network that includes one or more of the other routers. The path includes a plurality of next hops from the router to a destination. The control unit selects the path through the network so that the other router coupled to the network security device is positioned along the path between the router and the destination. The one or more interfaces further forward at least a portion of the network traffic along the determined path to the one or more other router such that the network security devices coupled to the included one or more other routers each applies the one or more corresponding security services to the portion of the network traffic forwarded via the determined path.

In another embodiment, a computer-readable medium comprises instructions for causing a programmable processor to receive, with a first router included within a network, security information that describes a security service provided by a network security device positioned within the network, wherein the network security device couples to a second router different from the first router and performing, based on both topology information describing the network and the received security information, path selection to determine a path through the network that includes the second router based on the security information. The path includes a plurality of next hops from the first network router to a destination. The first router selects the path through the network so that the second router coupled to the network security device is positioned along the path between the first router and the destination. The computer-readable medium further comprises instructions for causing the programmable processor to forward, with the first router, at least a portion of the network traffic along the determined path to the second router such that the network security device coupled to the second router applies the security service to the portion of the network traffic forwarded via the path.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
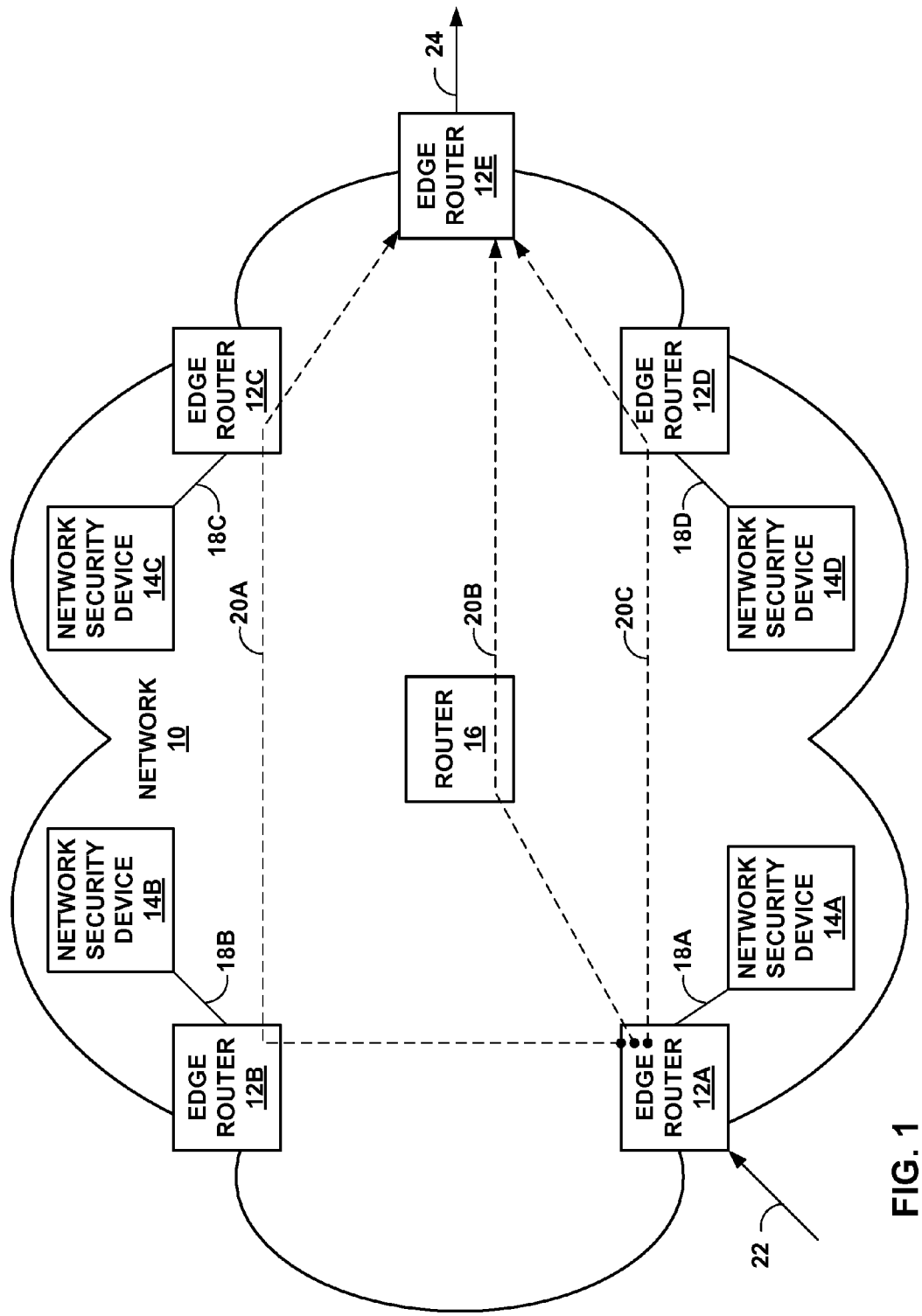
FIG. 1 is a block diagram illustrating an exemplary network in which a network device implements the secure path selection techniques described in this disclosure.

FIG. 1 is a block diagram illustrating an exemplary network 10 in which a network device, such as edge router 12A, implements the secure path selection techniques described in this disclosure. While described herein with respect to a particular network device, e.g., edge router 12A, the techniques may be implemented by any network device, including a router or any other network device capable of performing path, route, next hop, or link selection.

Network 10 may represent a private network, such as an enterprise network owned and operated by an enterprise for private or internal transfer of data, or a public network, such as a service provider network owned and operated by a service provider, such as Verizon, AT&T, and the like. While shown in FIG. 1 as a single network, network 10 may comprise a plurality of networks or sub-networks, each of which is interconnected to form network 10. Moreover, although not shown in FIG. 1, network 10 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection. Typically, these devices communicate with one another via a packet-based protocol, such as an Internet Protocol (IP)/Transmission Control Protocol (TCP). As a result, network 10 may represent or be referred to as a "packet-based" computer network.

As shown in FIG. 1, network 10 includes a plurality of edge routers 12A-12E ("edge routers 12"), a plurality of network security devices 14A-14D ("network security devices 14"), and a router 16. Each of edge routers 12A-12D couple to one of network security devices 14 via a respective one of links 18A-18D ("links 18"). Each of edge routers 12 and router 16 may couple to one another directly via a single link similar to each of links 18 or indirectly via a plurality of links, wherein intermediate network devices are positioned between each of edge routers 12 and router 16. For ease of illustration purposes, however, these links and possible intermediate network devices are not shown in FIG. 1. Instead, it is assumed that each of edge routers 12 and router 16 are communicatively coupled to one another either directly or indirectly.

Edge routers 12 may each represent a network device that resides at the edge of network 10, where one or more of edge routers 12 may route network traffic via paths selected or determined in accordance with the secure path selection techniques described in detail below. Network security devices 14 may each represent a network device that provides one or more security services, which may include a firewall, an anti-virus, and an Intrusion Detection/Prevention (IDP) service. Network security devices 14 may each comprise one or more of a firewall device, an IDP device, an Integrated Security Gateway (ISG) device, or any other device capable of providing one or more security services.

While shown in FIG. 1 as separate devices 14 from edge routers 12, network security devices 14, as described in more detail below, may be integrated within edge routers 12. In this instance, network security devices 14 may represent service or security cards included within edge routers 12, where each of edge routers may be considered to "internally couple" to the respective service or security cards. Examples of routing devices having integrated security services are described in U.S. Provisional Patent Application 61/088,916, entitled "ROUTING DEVICE HAVING INTEGRATED MPLS-AWARE FIREWALL," filed Aug. 14, 2008, the entire contents of which are incorporated by reference. Other Examples are described in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," which is incorporated herein by reference. Furthermore, while FIG. 1 depicts, for ease of illustration, each of edge router 12A-12D coupling to a single respective network security device 14, each of edge routers 12 may not couple to a network security device, such as edge router 12E, or may couple to a plurality of network security devices.

Often, two or more network security devices similar to network security devices 14 may couple to a single edge router, such as edge router 12A, to offer a so called "high-availability" network configuration. This configuration is "high-availability" in the sense that one of the network security devices is actively processing network traffic while the other network security devices acts as a backup to the first active network security device. If the first network security device fails, one of the backup network security devices may switch to the active network security device to provide high availability of security services to the network. This high availability configuration, however, requires redundant devices and therefore may be expensive and decrease utilization of network security devices.

Router 16 may represent an internal or core network device that resides internal to network 10. Router 16 may differ from edge routers 12 in that router 16 does not directly receive network traffic entering network 10 or forward network traffic directly to destinations residing outside of network 10. That is, edge routers 12 may each receive network traffic from network devices residing outside of, external to, or otherwise not included within network 10 and forward network traffic to network devices outside of network 10. Router 16 however may represent a transit network device through which network traffic received by edge routers 12 may be forwarded. In this respect, router 16 may only receive network traffic from network devices inside of, internal to, or otherwise included within network 10, such as edge routers 12, and forward network traffic to network devices inside of network 10. As a result, router 16 may be referred to herein as a "core router," while routers 12 may be referred to as "edge routers."

To forward traffic, edge routers 12 and router 16 may implement a routing protocol to resolve one or more paths through the network. A path may comprise one or more "hops" arranged in a series, where a "hop" refers to a traversal of a single link along the path. In other words, a path may comprise one or more links from a given source to a given destination within network 10. Each hop of the path may identify, usually by an address, a network device that terminates each link included within the path. In accordance with the routing protocol, edge routers 12 and router 16 may select these paths through the network by communicating information concerning these hops or the links interconnecting the hops.

For example, in accordance with a class of routing protocols referred to as "link state routing protocols," edge routers 12 and router 16 may exchange information concerning states of links to which each of edge routers 12 and router 16 couple. An example link state protocol may include an Open Shortest Path First (OSPF) routing protocol. In accordance with the OSPF routing protocol, edge routers 12 and router 16 may exchange Link State Advertisements (LSAs) that describe the state of these links to which each of edge routers 12 and router 16 couple.

An exemplary LSA may describe the state of each link by specifying link state information that includes information concerning a destination or "next hop" reached by the link, a cost associated with each link (e.g., bandwidth each link supports), as well as, whether the link is up (e.g., active) or down (e.g., inactive). Each of edge routers 12 and router 16 may propagate the LSA from every other edge router 12 and router 16 to one another such that each of edge routers 12 and router 16 may maintain link state information concerning all of the links within network 10.

From this link state information, each of edge routers 12 and router 16 may construct a topology of network 10. This topology constructed based on the link state information may be referred to as a "network link topology" or simply, "link topology" or "network topology." The network topology may comprise a graph data structure, whereby each links forms a corresponding edge of the graph and each destination or hop to which each link connects forms a node of the graph. Routing devices, such as edge routers 12 and router 16, may maintain this network or link topology in a database.

Edge routers 12 and router 16 may utilize this link topology to resolve paths through network 10 by traversing the graph data structure and selecting the series of one or more hops that form the path. Often, when resolving paths, hops may be referred to as the "next hop" in that a path may be resolved by iteratively selecting, from a given source, the "next hop" along the path until a given destination is reached. In accordance with the OSPF routing protocol, edge routers 12 and router 16 may resolve paths through network 10 by traversing the graph to construct a shortest path tree data structure using a method derived from Dijkstra's algorithm. A shortest path tree data structure may represent a sub-graph of the graph or network topology that is constructed such that the distance between the selected node, e.g., the one of edge routers 12 and router 16 constructing the short path tree, and all other nodes of the graph is minimal. While constructing the shortest path tree, each of edge routers 12 and router 16 may prefer paths with lower associated costs to resolve any two or more paths that comprise the same distance to one of the other nodes. That is, if two paths between the selected node and one of the other nodes comprise the same distance, e.g., number of hops, the path to the one of the nodes may be resolved by selecting the path with the lowest overall cost.

One or more of edge routers 12 and router 16 may also implement an extension to the routing protocol that facilitates traffic engineering. Traffic engineering refers to a process whereby dynamic properties are considered during the path selection process. For example, a Traffic Engineering (TE) extension to the OSPF protocol, with the combined result referred to commonly as an OSPF-TE routing protocol, may facilitate traffic engineering within the OSPF protocol. Typically, those of edge routers 12 and router 16 that implement the OSPF-TE protocol transmit these dynamic link properties, such as a maximum reservable bandwidth property, a reserved bandwidth property, and/or an available bandwidth property, via an opaque LSA. An "opaque LSA" refers to an LSA that includes fields of information for a particular extension of a link state protocol, such as the TE extension, where those network devices that do not implement the extension may opaquely forward the information particular to the extension without otherwise processing or acknowledging the presence of this information in the LSA.

Regardless of how these dynamic link properties are communicated, those of edge routers 12 and router 16 that implement the OSPF-TE protocol may dynamically update the network topology based on these dynamic link properties. These edge routers 12 and router 16 may then engineer the forwarding of traffic by selecting paths through network 10 based on the current state of the links as represented by the dynamic link properties. If a link for example along a selected path becomes congested, e.g., the available bandwidth property for that link indicates a low available bandwidth, those of edge routers 12 and router 16 that implement the OSPF-TE protocol may reroute one or more paths around the congested link to alleviate the congestion and thereby dynamically improve performance with network 10. In this manner, those of routers 12, 16 that implement the OSPF-TE protocol may perform "traffic engineering" based on dynamic link properties to alleviate congestion within network 10.

In accordance with the principles of the invention, one or more of edge routers 12 may perform the secure path selection techniques to generally select paths through network 10 based on security information that describes security services provided by one or more of network security devices 14. These secure path selection techniques may augment standard path selection, as describe above, such that those of edge routers 12 that implement the secure path selection may select paths based not only on the link state information (as represented by the network topology) but also on the security information. In this respect, edge routers 12 may "secure" paths through the network by selecting these paths such that one or more network security devices 14 apply security services to network traffic traveling the particular path.

For example, a first network device, such as edge router 12A, may receive security information that describes a security service provided by network security device 14B included within network 10. Network security device 14B, as described above, couples to a second network device included within network 10, e.g., network device 12B, different from the first network device, e.g., network device 12A. This security information may include a location or address of network security device 14B and one or more security services provided by the network security device. Edge router 12A may receive this security information using a link state protocol, such as the above described OSPF protocol, that has been extended in accordance with the techniques described herein so as to include additional information. Moreover, edge router 12A may receive this security information via an opaque LSA, where the security information is embedded within an opaque field of the opaque LSA, similar to the dynamic link properties described above. This opaque LSA that includes security information may be referred to herein as a "security LSA."

Edge router 12A may then, upon receiving this security information via the security LSA, construct a security table that comprises a plurality of entries, one for each of the plurality of network security devices 14. Each entry may store security information for a corresponding one of the plurality of network security devices 14. This security table may represent a "security topology." Edge router 12A may maintain the security topology as an additional layer of information on top of the network topology. Edge router 12A may utilize the security topology in conjunction with the network topology to select or determine paths through the network. Once selected, edge router 12A may determine whether the selected path exists and, if not, establish the path via a protocol, such as a Multi-Protocol Label Switching (MPLS) signaling protocol. One example of a MPLS signaling protocol includes a Label Distribution Protocol (LDP). In LDP, the established path is referred to as a "Label Switched Path" or "LSP," and paths 20A-20C ("paths 20"), as shown in FIG. 1, may be referred to as LSPs 20A-20C ("LSPs 20").

As shown in FIG. 1, edge router 12A may determine or select paths 20 through network 10 based on the security topology. Edge router 12A may, in some instances, determine or select one or more of paths 20 dynamically, automatically, or without administrative input by overlaying the security information or topology on top of the network topology and thereby leverage the path selection process of the traffic engineering protocols, such as the OSPF-TE protocol, to perform the secure path selection techniques described herein. Alternatively or in conjunction with this dynamic path selection, one or more of paths 20 may be configured or provisioned statically by an administrator. Often, one or more of paths 20 are dynamically determined, such as path 20A, while another path, such as path 20C, is statically provisioned as a backup to path 20A (thereby possibly providing so-called "high availability").

In instances where edge router 12A dynamically determines paths 20, edge router 12A may determine or select one of paths 20 based on security information learned from each of edge routers 12B-12D concerning one or more security services provided by network security devices 14 to which each of edge routers 12B-12D couples via links 18B-18D. Edge router 12A may further dynamically determine one or more of paths 20 in accordance with one or more policies included within edge router 12A (not shown in FIG. 1). The network administrator may configure the policies by indicating the portion of network traffic 22 received by edge router 12A and one or more security services to be applied to the indicated portion of network traffic 22.

When selecting or determining paths 20 through network 10, edge router 12A may access the above described security topology to determine which of the plurality of network security devices 14 provide the services identified by one of the policies. Edge router 12A may then return one or more addresses identifying one or more network security devices 14 that satisfy the policy. In some instances, the security information maintained by edge router 12A may indicate an available bandwidth property or some other dynamic property, similar to those described above for the OSPF-TE extension, related to the utilization of each of the plurality of network security devices 14. Edge router 12A may then select one or more network security devices 14 based not only on the security services provided by each of network security devices 14 but also on the bandwidth availability or more generally utilization of each corresponding one of network security devices 14.

Next, edge router 12A may resolve the network topology to determine one of paths 20 through network 10 that flow through the identified addresses according to the traffic engineering protocol. That is, edge router 12A may determine or select one of paths 20 that flows through the identified one or more of network security devices 14 or, more particularly, the corresponding one or more of network devices 12 to which the identified one or more of network security devices 14 couple.

As an example, edge router 12A may receive network traffic 22 and identify one or more policies associated with a portion of network traffic 22. Edge router 22 may access the security topology to identify one or more of network security devices 14 that provide security services identified in the policy associated with the portion of network traffic 22. Edge router 22 may identify, for example, that network security device 14D provides security services identified by the corresponding policy. Edge router 12A may then determine path 20C by resolving the network topology in accordance with traffic engineering protocol and establish this path 20C through network 10. Next, edge router 12A forwards this portion of network traffic 22 via path 20C, where edge router 12D along path 20C forwards the portion of network traffic 22 to network security device 14D. Network security device 14D may then apply the one or more security services identified by the one of the policies to the portion of network traffic 22, thereby securing that portion of network traffic 22 in accordance with the policy.

As another example, edge router 12A may receive network traffic 22 and, for another or second portion of network traffic 22, identify at least one other or second policy associated with this second portion of network traffic 22. This second policy may indicate that two security services are to be applied to this other corresponding portion of network traffic 22. Edge router 12A may next access the security topology to identify which of network security devices 14 apply these two security services. Assuming a single one of network security devices 14 does not apply both of these security services, edge router 12A may identify two different ones of network security devices 14 that each performs one of the security services, e.g., network security devices 14B, 14C. Edge router 12A may then resolve the network topology to select path 20A and forward the second portion of network traffic 22 to edge router 12B, where network security device 14B applies the first security service identified by the corresponding second policy, which then forwards this portion to edge router 12C, where network security device 14C applies the second security service identified by the corresponding second policy. In this manner, edge router 12A may layer application of security services by selecting a path, such as path 20A, that flows through two of network security devices 14.

In some instances, edge router 12A may establish a path in accordance with a protocol that enables ordering of the hops along the path. For example, the MPLS signaling protocol may enable edge router 12A to specify a path that includes an ordered arrangement of hops, such that the path first flows through device 14B and next through device 14C. As another example, edge router 12A may specify a path, in accordance with the MPLS signaling protocol, comprising an ordering whereby the path flows first through router 16 then through router 14C and finally through router 14D. In this manner, edge router 12A may establish paths to arrange the order in which two or more security services are applied to the portion of traffic that travels the established path.

For the portion of network traffic 22 for which no policy is defined, edge router 12A may resolve a path through network 10 based only on the network topology in the manner described above. In some instances, edge router 12A may secure this portion of network traffic 22 by forwarding this portion to network security device 14A, which applies one or more security services to this portion of network traffic 22. Assuming path 20B is associated with a lower cost than path 20C and both of paths 20B, 20C comprise the same distance to edge router 12E, edge router 12A may select path 20B for this portion of network traffic 22 as it provides the least expensive path through network 10.

When resolving the network topology to select or determine each of paths 20 in accordance with the security topology, edge router 12A in effect layers the security topology on top of the network topology. In this respect, edge router 12A determines one or more network security devices 14 through which the path should flow in accordance with the security topology and then resolves a path that flows through those hops in accordance with the network topology. As mentioned above, edge router 12A may select those network security devices 14 based on dynamic link properties to facilitate, if not maximize, utilization of network security devices 14 and prevent over-utilization of network security devices 14, which may delay if not prevent delivery of network traffic 22. Edge router 12A may leverage the traffic engineering (TE) protocol, such as the OSPF-TE protocol, to determine these dynamic link properties of links 18.

Alternatively, edge router 12A may leverages the traffic engineering (TE) protocol, such as the OSPF-TE protocol, by utilizing the dynamic link properties transmitted in accordance with the TE protocol to determine a utilization, availability and/or capacity of each of links 18. Based on this information, the TE protocol may, as implemented by edge router 12A, for example, inherently select paths through network security devices 14 that are underutilized. Thus, if two or more of network security devices 14 provide the same service, edge router 12A, in accordance with the TE protocol, may select a path through network 10 that routes network traffic 22 to the one of network security devices 14 having an underutilized link. In this manner, edge router 12A may implement the secure path selection techniques to more efficiently utilize network security devices 14.

Once selected or determined, edge router 12A may establish paths 20 through network 10 in accordance with a network protocol, such as the MPLS signaling protocol described above. Each of paths 20 may comprise "through" or "transit" paths in that the destination of each of these paths resides outside of network 10. As a result, each of paths 20 terminate at edge router 12E, which then forwards incoming network traffic 22 as outgoing network traffic 24. Often transit paths are defined within service provider networks to facilitate the transfer of large amounts of network traffic from one end of a network to another to connect one network to another network. While described with respect to transit paths, the techniques should not be limited to transit paths but may apply to selecting other types of paths, such as paths that terminate within network 10 or "terminating" paths.

Edge router 12A may therefore determine one or more paths 20 through network 10 that includes the second network device, e.g., one of edge routers 12B-12D, based on the security information. In other words, edge router 12A may select one or more of paths 20 such that the path includes a plurality of next hops from the first network router, e.g., edge router 12A, to a destination and so that the second network router coupled to the network security device is positioned along the path between the first network router and the destination. After establishing the one or more of paths 20, edge router 12A may forward at least a portion of network traffic 22 via the determined one of paths 20 to the second network device, e.g., one of routers 12B-12D, such that one or more of network security devices 14B-14C coupled to the second network device, e.g., edge routers 12B-12D, applies the security service to the portion of the network traffic forwarded via the determine one or more paths 20.

In this manner, edge routers 12 may secure paths 20 within network 10 in accordance with the secure path selection techniques described herein. Edge router 12A, as described above, may facilitate utilization of network security devices 14 by leveraging the dynamic link properties of the TE protocol to select paths, such as paths 20, through underutilized network security devices 14. Additionally, edge router 12A may, by maintaining the security topology in accordance with the secure path selection techniques described herein, layer application of security services by selecting a path through network 10 that routes network traffic 22 through two or more of network security devices 14.

Furthermore, edge router 12A, by maintaining the security topology in accordance with the secure path selection techniques, may enable administrators more freedom in positioning network security devices 14 within network 10. For example, an administrator may position network security devices 14 at any location within network 10 and edge routers 12 may dynamically inform one another of the location of network security devices 14, as well as, the security services offered by these network security devices 14. Edge routers 12 may then route traffic to network security devices 14 regardless of the locations of the network security devices 14 within network 10 in accordance with the secure path selection techniques described herein.

Figure 2:
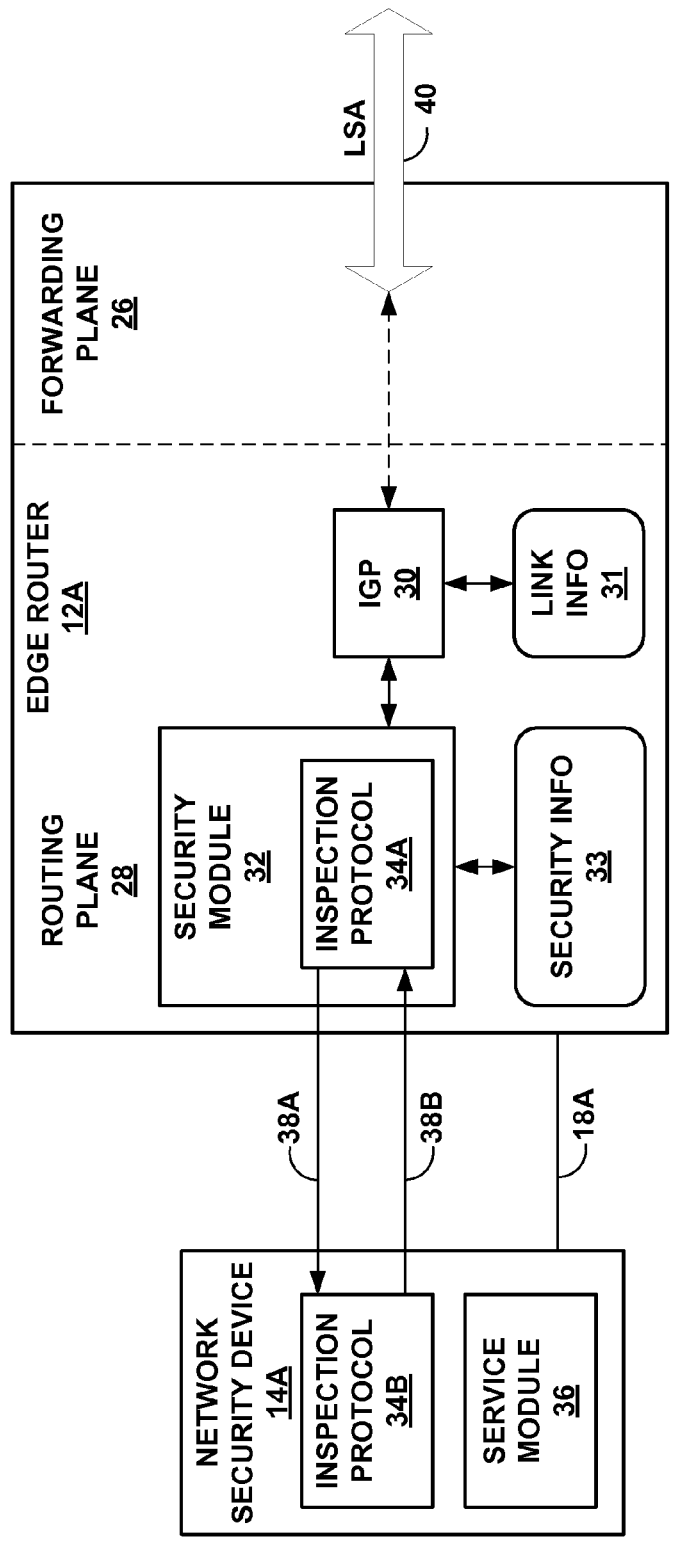
FIG. 2 is a block diagram illustrating an example interaction between example embodiments of the edge router and the network security device of FIG. 1 to collect security information in accordance with the techniques described herein.

FIG. 2 is a block diagram illustrating an example interaction between example embodiments of edge router 12A and network security device 14A of FIG. 1 to collect security information in accordance with the techniques described herein. In particular, FIG. 2 depicts exemplary embodiments of edge router 12A and security device 14A that each implements the secure path selection techniques described in this disclosure. Again, edge router 12A may represent any network device capable of selecting or determining paths within a network, such as network 10 of FIG. 1, and the techniques should not be limited to any particular network device. Security device 14A comprises any network security device capable of applying security services to network traffic, such as network traffic 22 shown in FIG. 1.

As shown in the example of FIG. 2, edge router 12A provides a forwarding plane 26 for forwarding network traffic and a routing plane 28 responsible for routing the network traffic. In some instances, forwarding plane 26 may be distributed over a plurality of interfaces or interface cards in a multi-chassis router. In other instances, forwarding plane 26 may be located in a central location, such as a processing or control unit of edge router 12A. Typically, routing plane 28 resides in a central location, such as the control unit of edge router 12A.

While now shown in FIG. 2, edge router 12A may comprise a control unit, such as a programmable processor, and other hardware, such as memory, e.g., dynamic and/or static Random Access Memory (RAM) and storage devices, such as hard drives, compact disk (CD) drives, digital video disk (DVD) drives, and the like. This memory or, more generally, computer-readable storage medium, may comprise or store instructions that cause the programmable processor to perform the secure path selection techniques described herein. In other words, the instructions may comprise one or more software or computer programs that the control unit executes to implement the secure path selection techniques described herein. In this respect, this hardware may include the following modules described with respect to routing plane 28.

Routing plane 28 includes an Interior Gateway Protocol module 30 ("IGP 30") and a security module 32. IGP 30 may represent any software and/or hardware module that implements an interior gateway protocol, such as the OSPF protocol, an Intermediate System to Intermediate System (IS-IS) routing protocol, an Interior Gateway Routing Protocol (IGRP), an Routing Information Protocol (RIP), or any other interior protocol. While described herein with respect to IGPs, the techniques should not be limited in this respect, but may include Exterior Gateway Protocols (EGPs), such as a Border Gateway Protocol (BGP). IGP 30 may generally represent a module that maintains the link or network topology, which is shown in FIG. 2 as link information 31 ("link info 31").

Security module 32 may represent a software and/or hardware module that maintain the above described security topology, which is shown in FIG. 2 as security information 33 ("security info 33"). Security module 32 may include an inspection protocol module 34A ("inspection protocol 34A") by which security module 32 may inspect network security devices to which edge router 12A couples, e.g., network security device 14A. Inspection protocol module 34A may implement a proprietary inspection protocol developed to interface with network security devices 14 and gather security information 33.

Network security device 14A may likewise include an inspection protocol module 34B ("inspection protocol 34B") similar to that of inspection protocol module 34A of edge router 12A. Inspection protocol module 34A may interface with inspection protocol module 34B to collect security information 33. In this respect, inspection protocol module 34A may implement a server or host version of the inspection protocol while inspection protocol module 34B may implement a client version of the inspection protocol. Network security device 14A may also include a service module 36 that includes one or more of the above described security services. Service module 36 may therefore represent a software and/or hardware module that applies one or more security services to network traffic received directly from edge router 12A and indirectly from other edge routers 12 in accordance with the techniques described herein.

In accordance with the secure path selection techniques described in this disclosure, routing plane 28 of edge router 12A may employ security module 32 to determine security information 33 for any network security devices to which edge router 12A couples, e.g., network security device 14A. Security module 32 may access network security device 14A in accordance with the inspection protocol. That is, inspection protocol module 34A may access network security device 14A in accordance with the inspection protocol and issue a communication 38A requesting that inspection protocol module 34B provide information concerning the security services applied by service module 36.

Inspection protocol module 34B may, in response to request communication 38A, inspect service module 36 to determine the security services applied by service module 36 and return this security information to inspection protocol module 34A via a response communication 38B. Inspection protocol module 34A may then update security information 33 to reflect this security information receive via response communication 38B. Both of communications 38A, 38B may occur in accordance with the proprietary inspection protocol described above and implemented by inspection protocol modules 34A, 34B. Inspection protocol module 34A may further monitor link 18A to determine the above described dynamic link properties of link 18A that reflect a utilization of network security device 14A. Inspection protocol module 34A may further store this information as security information 33. In other words, security information may include security availability information that identifies availability or utilization of the corresponding network security device 14.

Meanwhile, IGP 30 may receive and transmit a plurality of LSAs 40 via forwarding plane 26. For example, IGP 30 may transmit one of the plurality of LSAs 40 that indicates a link state for link 18A coupling edge router 12A to network security device 14A. In particular, this one of LSAs 40 may comprise an opaque LSA that includes the dynamic link properties described above concerning this link 18A. IGP 30 may also receive LSA from each other one of edge routers 12, as well as, router 16 indicating the link state of links each of these routers 12, 16 couple. IGP 30 may then update link information 31 to reflect the link states indicated by each of LSAs 40. IGP 30 may maintain link information 31 as the above described network topology.

Security module 32 may also in response to receiving security information via response communication 38B forward the security information concerning services applied by network security device 14A to IGP 30. That is, security module 32 may generally forward any security information concerning security services applied by network security devices to which edge router 12A directly (or in some instances, indirectly) couples, such as network security device 14A to IGP 30. This security information, as described above, may also concern a bandwidth or other utilization factor of network security devices 14 to which edge router 12A directly couples. Security module 32 may, in some instances, encrypt the security information such that this security information cannot be intercepted and used in formulating malicious network attacks. Only other security modules, similar to security module 32, may decrypt this security information thereby preserving the confidentiality and increasing the opaqueness of this information as it traverses network 10.

In response to this security information, IGP 30 may generate an opaque LSA that includes an opaque field specifying this security information. IGP 30 may then forward this information as one of LSAs 40 to each of the other edge routers 12 and router 16. Typically, IGP 30 forwards each of LSAs 40 to a neighboring or adjacent device, whereupon that adjacent devices forwards each of LSAs 40 to its neighbors or adjacent devices, and so on until each of LSAs 40 traverse network 10 in its entirety.

In this manner, edge router 12A may determine security services applied by network security devices 14 to which edge router 12A directly couples and forward this security information to other ones of edge routers 12 and router 16. Further, edge router 12A may determine, in accordance with the security path selection techniques, security services applied by other ones of network security devices 14 not directly coupled to edge router 12A, as well as, utilization properties of these network security devices 14. For example, IGP 30 may receive an opaque one of LSAs 40 from another one of edge routers 12 that includes an opaque field specifying security information concerning another one of network security devices 12. When processing this opaque LSA, IGP 30 may forward the security information (which may be encrypted as described above) included within the opaque LSA to security module 32, which then (after possibly decrypting the information) update security information 33 with the security information. Accordingly, edge router 12A may maintain security information 33 for each network security device 14 within network 10.

Figure 3:
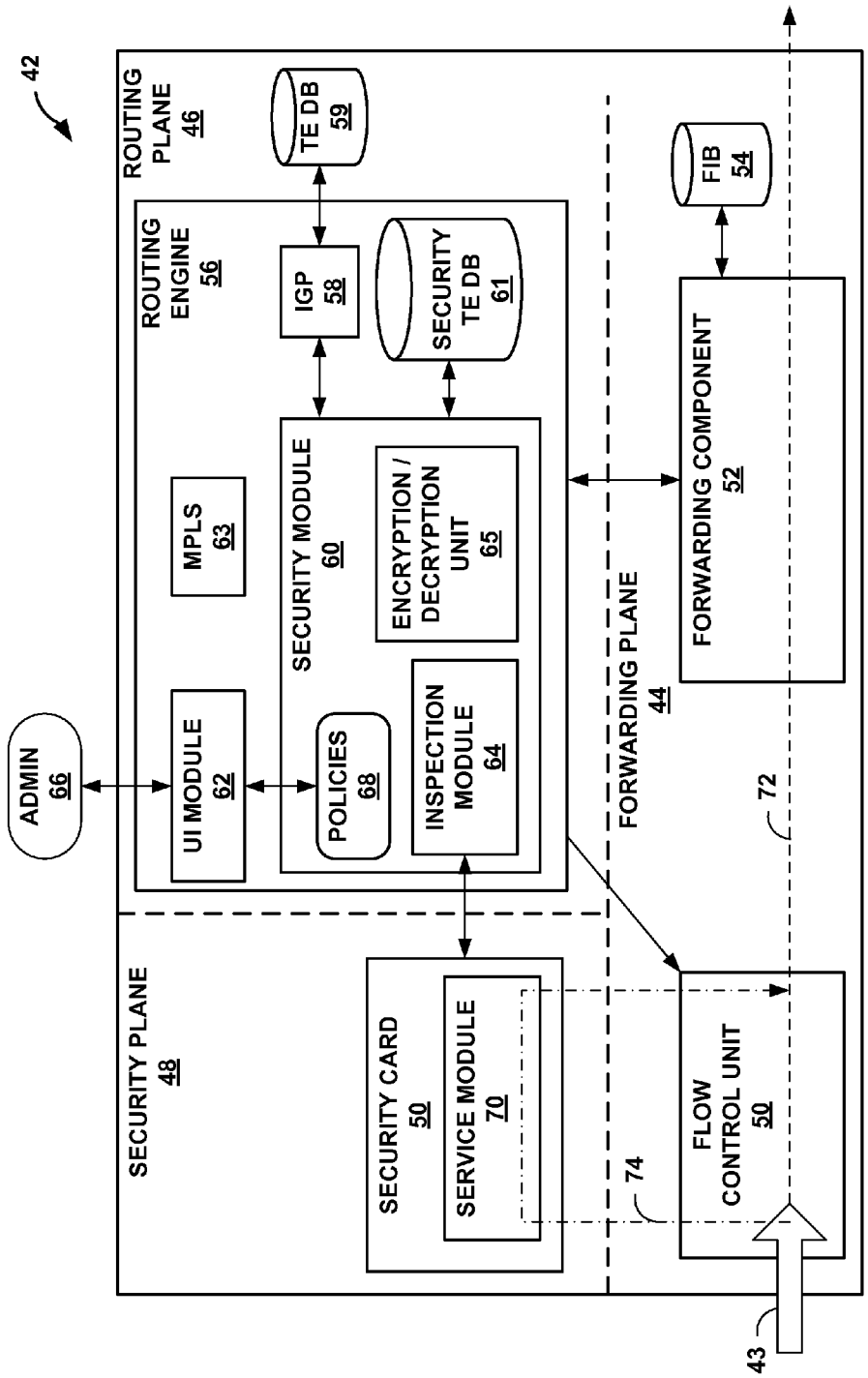
FIG. 3 is a block diagram illustrating an example embodiment of an edge router that performs the secure path selection techniques described in this disclosure.

FIG. 3 is a block diagram illustrating an example embodiment of an edge router 42 that performs the secure path selection techniques described in this disclosure. Edge router 42 may be substantially similar to edge router 12A in that edge router 42 may reside at the edge of a network and process network traffic 43, similar to network traffic 22, entering the network. Edge router 42, however, may include a network security device or, better stated, implement the functionality of network security device within edge router 42 in a separate security plane.

Edge router 42 may therefore, similar to edge router 12A, include a forwarding plane 44 and a routing plane 46, but also include a security plane 48. While both of forwarding plane 44 and routing plane 46 are shown in more detail in FIG. 3, forwarding plane 44 and routing plane 46 may be substantially similar to forwarding plane 26 and routing plane 28, as described with respect to FIG. 2. Service plane 48 may implement the functionality of a network security device, such as network security device 14A, as at least one security card 50. Edge router 42 may therefore couple to security card 50 via an internal coupling or connection. In this sense, edge router 52 may internally couple to security card 50.

Forwarding plane 44 may include a flow control unit 50 and a forwarding component 52. Flow control unit 50 may represent a software and/or hardware module that determines to which flow each packet or data unit of network traffic 43 belongs. Forwarding component 52 may represent a software and/or hardware component, such as one or more interface cards (not shown in FIG. 3), that forwards network traffic 43. Forwarding component 43 may represent a central or distributed forwarding engine, where a distributed forwarding engine is distributed across a plurality of interface cards and a central forwarding engine resides in a central location or control unit of edge router 42. Forwarding component 52 may forward network traffic 43 in accordance with a Forwarding Information base 54 ("FIB 54"). FIB 54 may comprise an association or table of mappings identifying an interface by which to forward a particular packet or data unit of traffic 43. U.S. Pat. No. 7,184,437 provides details on an exemplary embodiment of a router that utilizes a radix tree for route resolution, the contents of which is incorporated herein by reference in its entirety. Moreover, forwarding plane 44 may be provided by dedicated forwarding integrated circuits normally associated with high-end routing and forwarding components of a network router. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Routing plane 46 may include a routing engine 56 that resolves routes through network 10 in accordance with one or more of a plurality of routing protocols. Routing engine 56 may include an Interior Gateway Protocol (IGP) module 58 ("IGP module 58"), a security module 60, a User Interface (UI) module 62 ("UI module 62") and a Multi-Protocol Label Switching (MPLS) protocol module 63 ("MPLS 63"). IGP 58 may be substantially similar to IGP 30, as described above. Security module 60 may also be similar to security module 33 of FIG. 2, however security module 60 may include a inspection module 64 rather than an inspection protocol module 34A that communicates with a client inspection protocol module 34B of a separate network security device 14A. Inspection module 64 may represent a software and/or hardware module that inspects an internal or dedicates security card that applies one or more security services, such as security card 50.

UI module 62 may represent a software and/or hardware module that presents a user interface with which an administrator, such as administrator 66 ("admin 66"), may interact to enter input defining, editing, deleting or otherwise altering one or more of a plurality of policies 68. Policies 68 may represent the above described policies that identify a portion of network traffic 43 and a security service that edge router 42 is to apply to the identified portion of network traffic 43. MPLS 63 may comprise a hardware and/or software module that implements the various protocols of MPLS, such as the above described signaling protocol referred to as LDP, which routing engine 56 may utilize in establishing a path determined in accordance with the secure path selection techniques described herein. MPLS 63 may generally represent any module that implements a protocol capable of establishing a path through a network and, while described with respect to the MPLS signaling protocol, the techniques should not be limited to this exemplary protocol.

Security plane 48, as described above, may include one or more security cards, such as security card 50. Security card 50 may represent a card inserted into a multi-chassis router, where edge router 42 may include a multi-chassis router. Security card 50 may, similar to network security device 14A, include a service module 70 that applies one or more security services to network traffic 43. Inspection module 64 may therefore inspect service module 70 to determine the one or more security services applied by service module 22.

Initially, upon powering up, activating, starting or otherwise enabling edge router 42, admin 66 may interact with UI module 62 to define one or more of policies 68 within security module 60. In some instances, security module 60 may include pre-defined or pre-installed policies 68. Regardless of the manner in which policies 68 are loaded and/or defined, both IGP 58 and security module 60 may generate the above described link or network information and security information, which each respectively store to traffic engineering (TE) database (DB) 59 ("TE DB 59") and security traffic engineering (TE) database (DB) 61 ("security TE DB 61"). That is, TE DB 59 may represent, in general, a storage device that stores a current or up-to-date topology of a network, such as network 10. Security TE DB 61 may represent a storage device that stores a current or up-to-date security topology in accordance with the secure path selection techniques described herein. In other words, security module 60 may dynamically update security TE DB 61 with a full picture of all security devices within the network, which may be referred to as a "security topology."

Inspection module 64 inspect security card 50 to gather security information concerning services applied by security module 70 of security card 50. Inspection module 64 may store this information to security TE DB 61. As described above, this security information may include availability or utilization information. For internal network security devices, such as security card 50, security module 60 may represent this availability to security card 50 as a virtual link and determine dynamic link properties concerning this virtual link. For example, service module 70 may be able to process 300 megabits (Mb) per second (s) or Mbps of a firewall service and 100 Mbps of an IDP service. Security module 60 may determine this security information via inspection module 64.

After determining this security information, security module 60 may employ encryption/decryption unit 65 to encrypt the security information. Encryption/decryption unit 65 may represent a module that implements encryption and decryption algorithms for encrypting and decrypting data. In this instance, encryption/decryption unit 65 may encrypt security the determined security information. Once encrypted, security module 60 may forward this encrypted security information to IGP 58. IGP 58, upon receiving this information, may generate an opaque LSA that includes an opaque filed defining this encrypted security information and forward this opaque LSA to forwarding component 52, which in turn, may forward this opaque LSA as outgoing network traffic 72 to adjacent network devices within network 10.

To generate link information, IGP 58 may receive LSAs from other network devices via forwarding component 52. These LSAs may arrive as incoming network traffic 43. IGP 58 may process these LSA similar to IGP 30 and maintain link information within TE DB 59. IGP 58 may, again similar to IGP 30, process opaque LSAs that include an opaque field defining security information by forwarding the security information to security module 60. Security module 60 may employ encryption/decryption unit 65 to decrypt the security information, if encrypted. Security module 60 may next update and therefore maintain security TE DB 61 with this received security information to accurately reflect the security topology of the network, such as network 10. As described above, this security information may not only include information indicating the security services applied by a corresponding network security device but also availability or other utilization information concerning the availability of these services, or more generally, the availability of the corresponding network security device.

IGP 58 may then resolve paths, such as paths 20, through the network according to TE DB 59 in the manner described above. IGP 58 may, in order to resolve the paths, forward a destination, such as a destination address, to security module 60. Alternatively, IGP 58 may forward a flow, which may be represented by a five-tuple, to security module 60 when resolving the paths. A five-tuple may comprise a source address, a destination address, a source port, a destination port, and a protocol. Security module 60 based on the destination address or, alternatively, the five-tuple may access policies 68 to determine which security services to apply to network traffic 43 directed to the destination or associated with the flow. Security module 60 may retrieve one or more policies 68 associated with the destination or the flow and determine the security services indicated by the one or more associated policies 68.

After determining which security services to apply to the portion of network traffic 43 directed to the destination or associated with the flow, security module 60 may access security TE DB 61 to determine which network security devices, such as network security devices 14 or network security card 50 (which may be construed as an internal network security card), applies the one or more services identified by the associated one or more of policies 68. Security module 60 may identify one or more addresses corresponding to the one or more network security devices (or, in instances of internal network security devices, the router that includes the internal network security device) that apply the associated security services.

In some instances, security module 60 may determine two or more addresses for network security devices that each performs the same security service. To resolve this conflict, security module 60 may then access the availability information included within the security information and select the one of the two or more network security devices associated with a dynamic availability property indicating that this device has the most availability, e.g., the highest available bandwidth. Security module 60 may forward these addresses to IGP 58, which may utilize these addresses in resolving the paths through the network.

IGP 58 may perform a form a "loose" or constraint-based routing using these addresses in that the path selection performed by IGP 58 imposes the addresses a loose constraint when selecting hops through which the path must flow. The addresses may specify mandatory hops, however the IGP 58 may choose any other hops to construct the path from the given source to the given destination. IGP 58 may select the path based on the dynamic link properties to account for bandwidth utilization.

After determining one of the paths, IGP 58 may establish the path through the network in accordance with a link state protocol, such as a Multi-Protocol Label Switching (MPLS) signaling protocol. IGP 58 may therefore forward the path, or one or more addresses identifying each hop along the path, to MPLS 63, whereupon MPLS 63 establishes the a LSP through the network corresponding to the determined path in accordance with, for example, LDP.

As an example, MPLS 63 or some other path establishing protocol may, when establishing a given path, indicate for applicable hops of the path, e.g., those hops that provide security services, the services to be applied along with an identifier for the network security device that provides the services. MPLS 63 may include this information in a path setup request that it transmits throughout the network in order to setup or negotiate the path.

Routing engine 56 may then, after establishing the paths via MPLS 63, update flow control unit 50 such that flow control unit 50 forwards a portion of network traffic 43 to service card 50, as shown in FIG. 3 as service traffic 74. In particular, routing engine 56 may receive the setup request information via MPLS 63 and configure a bitmap variable in forwarding plane 44, one for each path, route or LSP currently traversing edge router 42. The bitmap variable may indicate that the forwarding engine forward traffic received via a particular path to the adjacent network security device, e.g., an external network security device 14A or an internal network security device such as security card 50. The bitmap variable may also indicate which services the corresponding adjacent network security device to apply to the received traffic. Forwarding plane 44 may then forward the portion of traffic 43, e.g., service traffic 74, to security card 50, for example, along with a communication indicating the type of service to apply to service traffic 74 based on the bitmap variable.

In this manner, routing engine 56 may identify a hop along the established path for a given flow as corresponding to security card 50. Routing engine 50 may, in some instances, update an entry that includes the bitmap variable corresponding to the flow for which the path was established such that flow control unit 50 forwards a portion of traffic 43 to security card 50 prior to forwarding this traffic 43 as outgoing traffic 72. Each flow entry may identify the flow by its corresponding five-tuple, and identify via the bitmap variable whether to apply one or more of the security services provided by security card 50.

Flow control unit 50 may then, upon receiving network traffic 43, access the flow table and determine whether a packet or data unit of network traffic 43 includes a five-tuple associated with one of the flow entries of the flow table. If not, flow control unit 50 may forward the packet as outgoing network traffic 72. However, if the packet includes a five-tuple identified by one of the flow entries, flow control unit 50 may determine, based on that flow entry, whether to forward the packet to security card 50. If the flow entry indicates that no services are to be applied, flow control unit 50 may once again forward the packet as outgoing traffic 72. If the flow entry does indicate that one or more services are to be applied, flow control unit 50 forwards the packet or data unit to security card 50. Service module 70 of security card 50 may then apply the identified one or more services.

Based on the application of the one or more security services, security card 50 forwards the packet back to flow control unit 50. If the security services identify or detect one or more network attacks, service module 70 may quarantine (e.g., store the packet in a restricted access memory) or drop the packet without forwarding the packet back to flow control unit 50. However, if no network attack is detected, service card 50 may forward the packet back to flow control unit 50, which then forwards the packet as outgoing traffic 72 via forwarding component 52.

Forwarding component 52 may also receive information from routing engine 56 indicating the established path by which to forward service traffic 74 processed by service card 50. Forwarding component 52 may store this path information to FIB 54 and upon receiving service traffic 74 of outgoing traffic 72, forward service traffic 74 in accordance with the path information stored to FIB 54. In particular, forwarding component 52 may access FIB 54 to determine which of the available paths to forward service traffic 74. Upon determining the path, forwarding component 52 may update service traffic 74 with any headers, labels, tags or other information typically required to route service traffic 74 along the path, such as MPLS labels. FIB 74 may indicate the output interface by which to forward this updated service traffic, whereupon forwarding component 52 may forward updated service traffic 74 via this interface to the network.

In some instances, the established path may traverse two or more network service devices, either external or internal to routers, whereupon these additional network security devices may apply one or more security services to service traffic 74. In this manner, one or more security services may be layered upon one another so as to apply multiple security services to a traffic traversing a particular path.

While processing packets is described above with respect to an internal network security device, e.g., security card 50, the techniques apply to external network security devices in a similar manner. In external instances, such as depicted in FIG. 2, flow control unit 50 may, instead of forwarding service traffic internally to service card 50, forward service traffic 74 via forwarding component 52 to an external network security device, such as network security device 14A. In most other respects, the techniques between the two various embodiments are similar and the techniques therefore should not be limited in any aspect to one or the other of the alternative embodiments.

Figure 4:
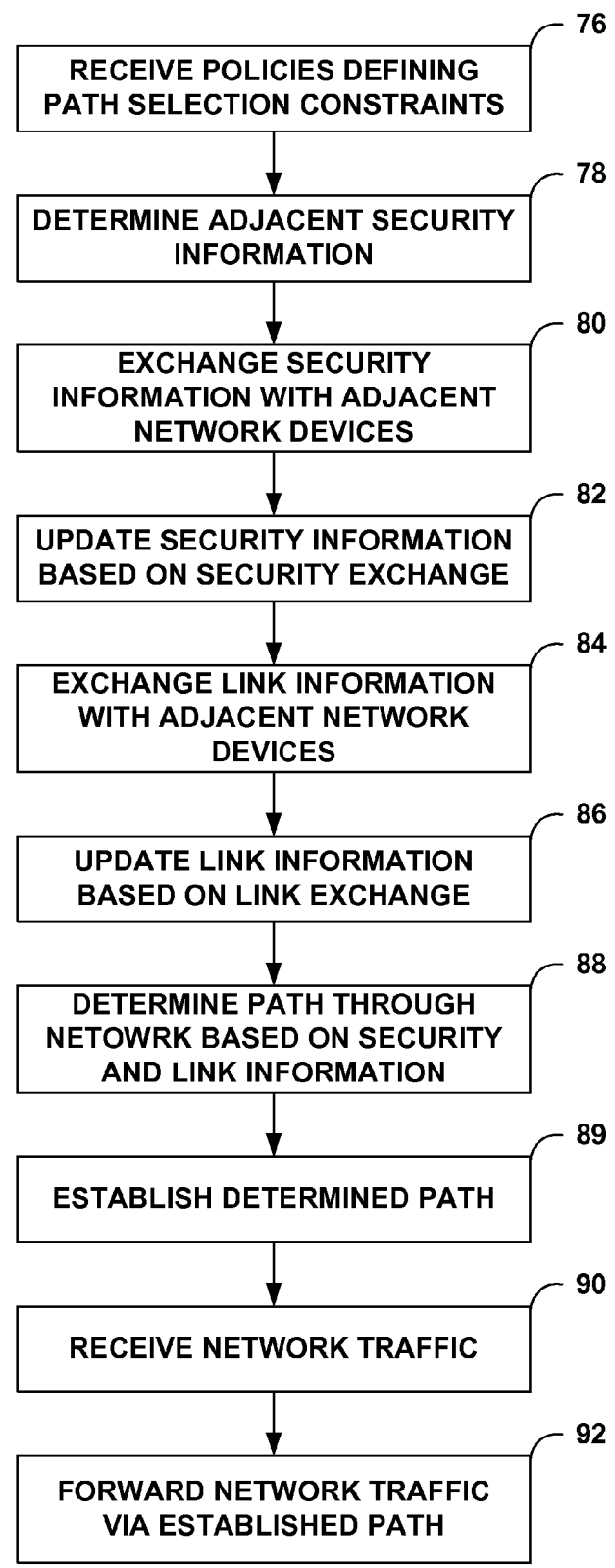
FIG. 4 is a flow chart illustrating an example operation of a network device in performing the secure path selection techniques described in this disclosure.

Moreover, while various module included within routing engine 56 are described as receiving security information, LSAs, opaque LSAs and other communications for ease of discussion, routing engine 56 may generally receive these communications via forwarding plane 44, e.g., interface cards, forwarding component 52 and/or flow control unit 50. Forwarding component 52 may, upon receiving an LSA, identify FIG. 4 is a flow chart illustrating an example operation of a network device, such as edge router 42 of FIG. 3, in performing the secure path selection techniques described in this disclosure. Although described with respect to edge router 42 of FIG. 3, the techniques may be implemented by any network device. Moreover, the techniques may be implemented by network devices that interact with a network security device external from the network device, such as edge router 12A, as shown in FIG. 2.

Initially, an administrator, such as admin 66, may specify or otherwise provide policies 68 to edge router 42. In particular, admin 66 may interact with a user interface presented by UI module 62 to input one or more of policies 68. Typically, admin 66 specifies polices 68 in order to initialize or before enabling edge router 42, however security module 60 may come pre-configured with one or more of policies 68. Regardless of how policies 68 are loaded, edge router 42 may receive policies 68 that define path selection constraints (76). Policies 68 defined path selection constraints in that each of policies 68 identify a portion of network traffic 43 and one or more corresponding security services to be applied to the identified portion of network traffic 43 that affect path selection, as described above.

Once activated or enabled, edge router 42 and, more particularly, security module 60 may determine security information for each network security device to which edge router 42 couples either externally or internally. As edge router 42 may only determine security information for network security devices to which it couples, the network security devices may be considered "adjacent" network security devices and, as a result, the security information may be referred to as "adjacent" security information. In this respect, security module 60 may determine adjacent security information (78).

For internal network security devices, such as security card 50, a security module, such as security module 60 of edge router 42 may employ an inspection module 64 in the manner described above to determine the adjacent security information. For external network security devices, such as network security device 14A of FIG. 2, a security module, such as security module 32 of edge router 12A, may employ an inspection protocol module 34A to interface with an inspection protocol module 34B of network security device 14A to determine the adjacent security information in the manner described above. Regardless of how the adjacent security information is collected, gathered, accessed or otherwise determined, security module 32 may update securing information, such as security information 33, as stored within a security TE DB, such as security TE DB 61. Security module 60 may also encrypt the security information, as described above, using an encryption/decryption unit 65.

Security module 60 may then forward the adjacent security information to IGP 58, whereupon IGP 58 may exchange adjacent security information with other network devices coupled to network security devices (80). Although exchange may imply a simultaneous transfer of information, IGP 58 may transmit a first set of adjacent security information collected by security module 60 via a first opaque LSA, as described above, at a first time and then receive at a second time (different from the first time) a second opaque LSA that defines a second set of adjacent security information concerning a different network security device that couples to a different network device. Upon receiving this adjacent security information concerning network security devices to which other network devices couple via another opaque LSA, IGP 58 may parse the LSA to retrieve this received adjacent security information, which IGP 58 then forwards to security module 60. Security module 60 may update the security information maintained within security TE DB 61 (82). As described above, security module 60 may, in this manner, maintain a security topology of the network within security TE DB 61.

For example, the following Table 1 may reflect security information for a network, such as network 10.

TABLE 1

| Network Security Device | Security Services | Available Bandwidth |
|---|---|---|
| 102.32.4.123 | AV, IDP | 5.5 GB |
| 102.32.4.7 | AV | 8.7 GB |
| 102.32.4.90 | FW | 1.4 GB |
| 102.32.4.15 | IDP | 5.8 GB |

Table 1 includes three columns, a first network security device column that identifies each of network security devices 14, for example, by Internet Protocol (IP) address assigned to each of devices 14, a second security services column that identifies security services applied by a corresponding one of devices 14, and a third available bandwidth column that identifies a utilization property associated with each network security device. In the first row under the header row, one of network security devices 14 assigned an IP address of 102.32.4.123, such as network security device 14A, applies an anti-virus (AV) service and an intrusion detection/prevention (IDP) service and has an available bandwidth of 5.5 gigabytes (GBs). Security module 60 may update this table based on security information either determined or received for each of the corresponding ones of network security devices 14.

In some instances, each entry, e.g., row of Table 1, may include an additional column identifying one or more interfaces of each corresponding network security device. Each interface may accept a different link and be assigned a distinct IP address and/or port different from every other interface. As a result, IGP 58 may transmits and receive opaque LSAs concerning each interface (as each is assigned a separate IP address) of a network security device. In other words, Table 1 may be modified as reflected in the following Table 2.

TABLE 2

| Network Security Device | Interface | Security Services | Available Bandwidth |
|---|---|---|---|
| 102.32.4.123 | 102.32.4.123:1 | AV | 5.0 GB |
|  | 102.32.4.123:2 | IDP | 6.0 GB |
| 102.32.4.7 | 102.32.4.7:23 | AV | 7.0 GB |
|  | 102.32.4.7:73 | AV | 10.4 GB |
| 102.32.4.90 | 102.32.4.90:14 | FW | 1.4 GB |
| 102.32.4.15 | 102.32.4.15:9 | IDP | 5.8 GB |

As shown above, Table 2 includes an additional interface column that identifies one or more interfaces of the corresponding network security device. In this instance, each interface is assigned a distinct port number, which is represented by the number following the colon separating the IP address from the port number. Each network security device entry therefore includes a sub-entry for each interface, where each sub-entry identifies the security services provided via that interface as well as the utilization metric or property, such as the available bandwidth. Table 2 therefore represents a further refinement of Table 1, and the techniques therefore should not be limited to the example of Table 1.

Meanwhile, IGP 58 may transmit and receive other LSAs, some of which may comprise opaque LSAs, that each defines link information or network information. The opaque LSAs may comprise the dynamic link properties described above used by TE protocols to select or determine paths through the network. IGP 58 may, in this respect, exchange link information with other network devices, such as other edge routers and core or internal routers, within the network and update link information stored to TE DB 59 (84, 86).

In some instances, some of this link information transmitted to other network devices may correspond to links by which edge router 42 couples to adjacent network security devices. Referring to FIG. 2, for example, IGP 30 may transmit link information concerning link 18A by which edge router 12A couples to network security device 14A. While a physical link may exist for external network security devices, for internal network security devices, IGP 58 may transmit link information concerning a virtual link by which edge router 42 couples to security card 50. In this respect, IGP 58 may forward an opaque LSA concerning virtual link information such that traffic engineering protocols may utilize this virtual information to select a path to security card 50. Moreover, IGP 58 may forward this information, in this instance, to security module 60, whereupon security module 60 may update security TE DB 61 with these availability or utilization properties. In other instances, security LSAs may include this availability information, and IGP 58 may not forward this information even though other opaque LSA may provide this same information.

By transmitting this link information via either security or other opaque LSAs, which may include dynamic link properties concerning either physical or virtual links, security module 60 and IGP 58 may determine or select an optimal path through the network that includes underutilized network security devices. For example, IGP 58 may resolve paths to a particular destination by first requesting any constraints that may restrict path selection from security module 60. IGP 58 may forward, as described above, a destination or flow (as defined by a five-tuple) to security module 60. Security module 60 may determine, based on policies 68, which security services to apply to the given destination or flow.

If one or more security services are defined for the flow, security module 60 accesses security TE DB 61 to determine which network security devices apply the determined one or more services. Security module 60 may, in some instances, resolve a conflict between two or more network security devices by utilizing the availability properties included within the security information detailing the security services provided by each corresponding one of the conflicting network security devices, as described above. After determining the one or more network security devices, security module 60 may forward the IP addresses assigned to each determined network security device to IGP 58.

IGP 58 may then determine or select the path that includes the one or more network security devices by accessing TE DB 59. In this manner, IGP 58 and security module 60 may determine a path through the network based on security and link information (88). Moreover, security module 60 may, by including information concerning links coupled to network security devices, more efficiently select network security device and thereby possibly improve utilization of these network security devices.

After selecting the path, IGP 58 may then forward the determined path to MPLS 63, whereupon MPLS 63 may establish the determined path through the network in accordance with the MPLS protocol (89). Edge router 42 may then receive network traffic 43 via one or more interfaces or interface cards, as described below in more detail (90).

Forwarding plane 44 may then forward at least a portion of network traffic 43 via the determined path (92).

As described above, forwarding plane 44 may be configured with the path or, more specifically, routing engine 56 may update forwarding component 52 with the determined path. Forwarding component 52 may then update FIB 54 to reflect the determined path. Routing engine 56 may also update flow control unit 50 with the determined path, as described above. Flow control unit 50 may then determine whether to forward at least a portion of network traffic 43 to security card 50 based on the updated flow table. Flow control unit 50 may then, according to flow table, forward a portion of network traffic 43 to service card 50 as service traffic 74.

Service module 70, upon receiving service traffic 74, may apply one or more security services to service traffic 74 and forward service traffic 74 back to flow control unit 50 based on the application of the one or more security services. Next, flow control unit 50 may forward service traffic 74 as outgoing traffic 72 to forwarding component 52, which may then forward at least a portion of outgoing traffic 72 in accordance with FIB 54 via the determined path. As described above, one or more network security devices residing along the path may apply one or more additional services, thereby enabling edge router 43 to layer application of services to network traffic 43, as described above.

Figure 5:
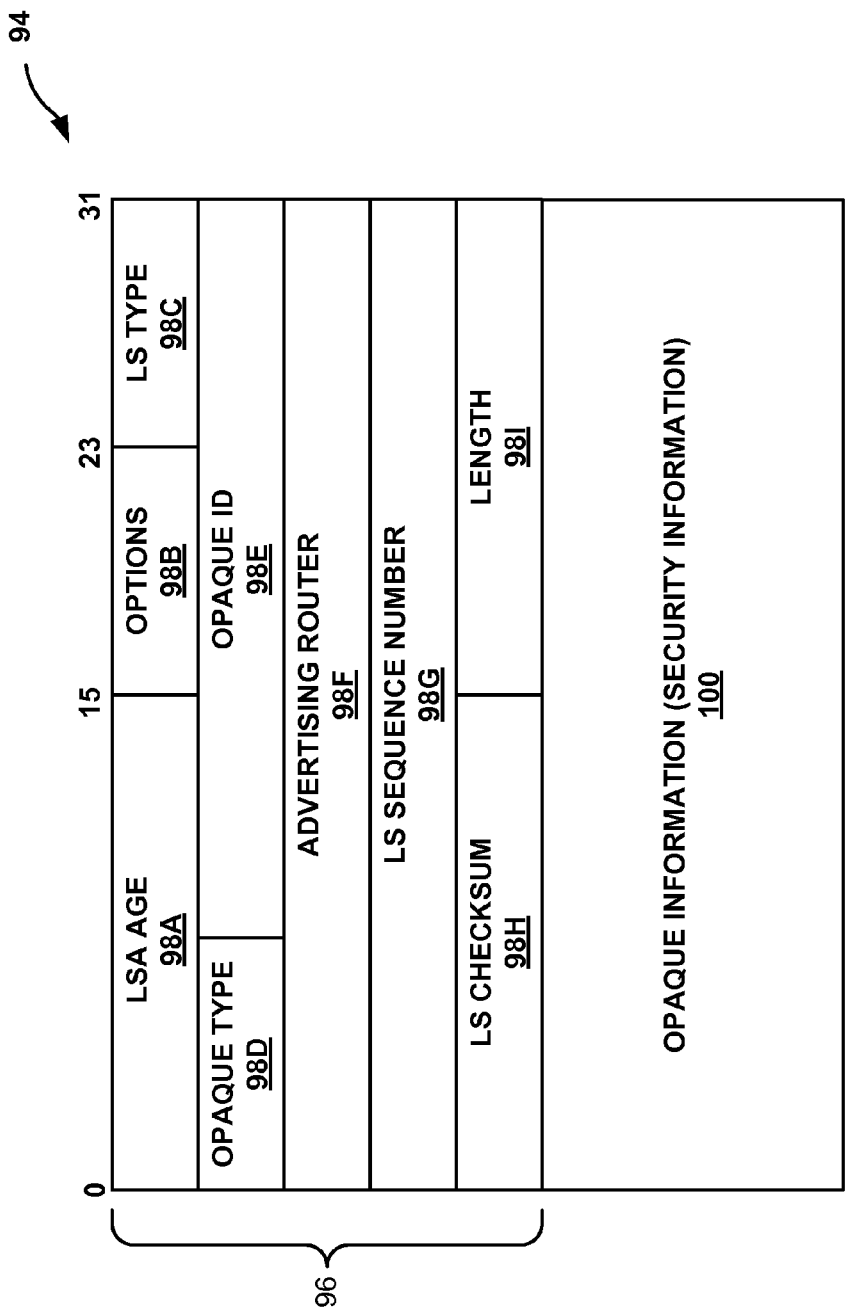
FIG. 5 is a block diagram illustrating an exemplary Link State Advertisement (LSA) that includes security information in accordance with secure path selection techniques.

FIG. 5 is a block diagram illustrating an exemplary Link State Advertisement (LSA) 94 that includes security information in accordance with secure path selection techniques. LSA 94 may comprise an opaque LSA, as described above. Moreover, LSA 94, as shown in the exemplary embodiment of FIG. 5, may comply with the OSPF protocol in that it adheres to the four byte width limitation specified by the OSPF protocol. That is, LSA 94 comprises a set of four-byte rows, as reflected in FIG. 5 by the 0-31 bit range for each row shown at the top of LSA 94. Further details of the format of opaque OSPF LSAs can be found in RCE 5250, Internet Engineering Task Force (IETF), July, 2008 herein incorporated by reference.

As shown in FIG. 5, LSA 94 includes an LSA header 96. LSA header 96 comprises an LSA age field 98A ("LSA age 98A"), an options field 98B ("option 98B"), an LS type field 98C ("LS type 98C"), a link state identifier field divided into an opaque type field 98D ("opaque type 98D") and an opaque ID field 98E ("opaque ID 98E"), an advertising router field 98F ("advertising router 98F"), a link state sequence number field 98G ("LS sequence number 98G"), a link state checksum field 98H ("LS checksum 98H") and a length field 98I ("length 98I"). Although shown as comprising fields 98A-98I ("fields 98"), LSA header 96 may comprise more or less fields 98 shown in FIG. 5.

LS age field 98A typically specifies the age of the LSA 94 in seconds and is used to distinguish between two LSAs specifying the same LSA sequence number in their respective LS sequence number field 98F. Options field 98B may specify which optional capabilities are associated with the LSA 94. LS type field 98C indicates the format and function of the LSA 94, i.e., the type of LSA. Particular to opaque LSAs, LS type field 98C may identify the topological range of distribution of LSA 94. For example, if LS type field 98C stores a "9," LSA 94 associated with LSA header 96 is distributed on a link-local scope, indicating that LSA 94 is not to be flooded beyond a local (sub) network. Alternatively, if LS type field 98C stores a "10," LSA 94 is distributed on an area-local scope, indicating that LSA is not to be flooded beyond their area of origin. Generally, LS type field 98C can be any value within the range of 9-11 for opaque LSAs, where a value of "11" indicates that LSA 94 can be flooded throughout an entire autonomous system. LS type filed 98C may, therefore, indicate whether LSA 94 is an intra or inter area opaque LSA.

The link state ID field typically identifies a portion of the routing domain that is being described by LSA 94. For opaque LSAs, such as LSA 94, the link-state ID of the opaque LSA is divided into opaque type field 98D and opaque ID 98E. An opaque type set to "1" indicates a traffic engineering LSA. LSA 94 may generally comprise an opaque type field 98D set to "1" to indicate that opaque information 100 relates to traffic engineering. Alternatively, opaque type field 98D may be set by IGP 60, for example, to any other value agreed upon to indicate that opaque information 100 stores security information. Opaque ID field 98E defines a unique ID identifying the portion of the routing domain that is being described by LSA 94.

Advertising router field 98E may specify the OSPF router identifiers of the LSA 94's originator. LS sequence number field 98F may comprise a signed 32-bit integer that OSPF modules, such as IGP module 58 uses to detect old and duplicate LSAs. LS checksum field 98G may indicate whether the LSA accompanying LSA header 58 contains errors, and IGP module 58 may employ LS checksum field 98G to discard possibly faulty LSAs 94. Length field 98H indicates the length of LSA 94.

IGP 58 may generate LSA 94, such that LSA header 96 identifies this LSA 94 as an opaque LSA. In this respect, IGP 58 may generate LSA 94 in accordance with RFC 5250. Specifically, IGP 58 may set LS type field 98C to one of values 9-11 depending on the topological scope desired. IGP 58 may further specify the correct opaque type in opaque type field 98D. Typically, as mentioned above, IGP 58 specifies an opaque type of "1" in opaque type field 98D to indicate that LSA 94 is an opaque LSA defining traffic engineering metrics or information. IGP 58 may generate the remaining field 98E-98I in accordance with the OSPF or OSPF-TE protocol. IGP 58 may set length field 98I to the appropriate length depending on the amount of opaque information 100.

IGP 58 may then insert security information received from security module 60 as opaque information 100 of LSA 94. RFC 5250 generally provided no restrictions upon the type of information a traffic engineering LSA, such as LSA 94, may store in opaque information 100. Thus, IGP 58 may again leverage the OSPF protocol to define security information within opaque information 100. As LSA 94 may include security information, LSA 94 may be referred to herein as a "security" LSA. A "security" LSA may represent one example of advertisement or data unit that includes security information and the techniques should not be limited to LSAs. In some instances, IGP 58 may encrypt security LSAs such that only security modules, such as security module 60, may decrypt these security LSAs. Security module 60 may therefore provide the key by which IGP 58 may encrypt these security LSAs. For this reason as well, these LSAs may be referred to as "security LSAs."

IGP 58 may prepend or otherwise edit the security information to inform indicate that opaque information 100 defines security information. As a result, other IGP or OSPF modules may, upon encountering opaque information 100 determine that this opaque information includes security information for processing by a security module, similar to security module 60. IGP 58 may then transmit LSA 94 so as to inform other network devices that operate in accordance with the secure path selection techniques of the security capabilities of adjacent network security devices coupled to edge router 43.

Figure 6:
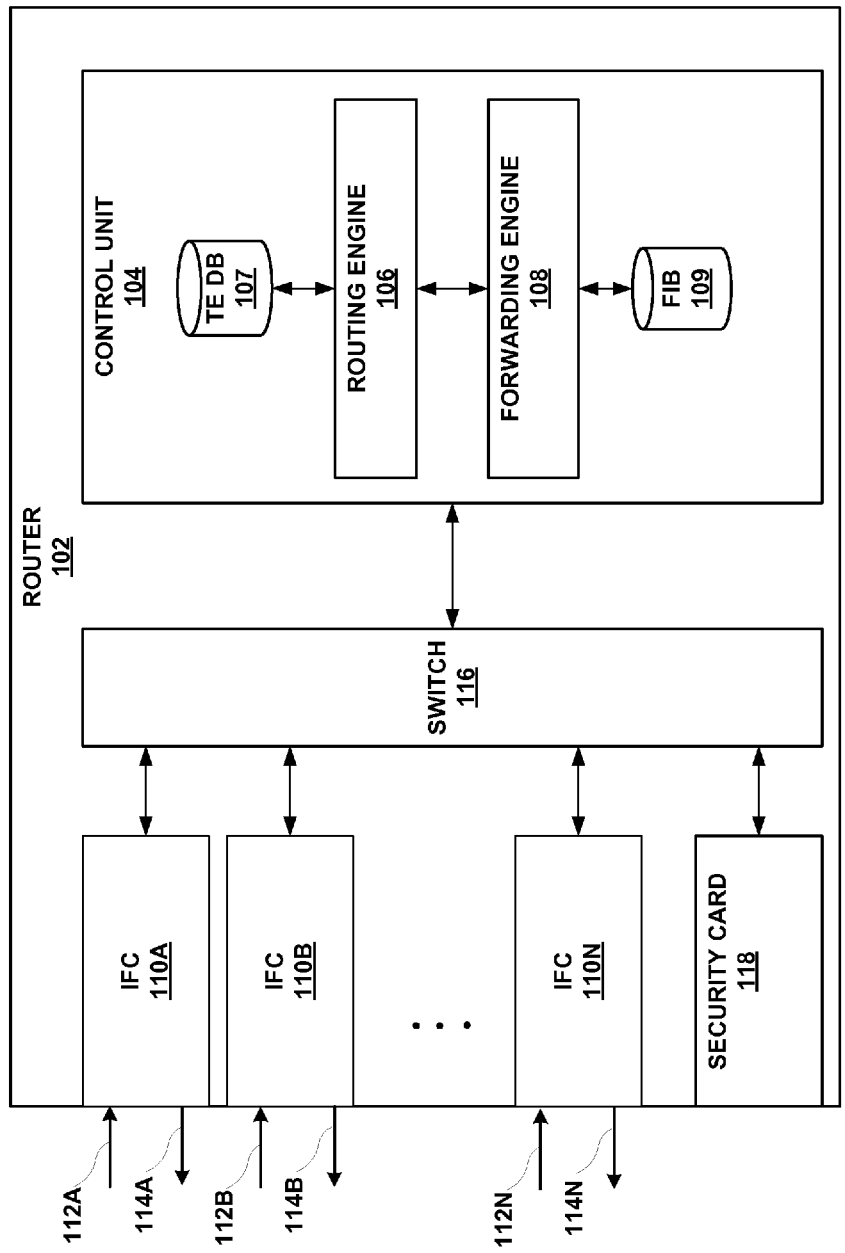
FIG. 6 is a block diagram illustrating another exemplary embodiment of a router that implements the secure path selection techniques.

FIG. 6 is a block diagram illustrating another exemplary embodiment of a router 102 that implements the secure path selection techniques. Although described with respect to router 102, any network device, such as a hub, switch, et cetera may implement the techniques described herein and the principles of the invention should not be limited to this exemplary embodiment.

As shown in FIG. 6, router 102 includes a control unit 104 that comprises a routing engine 106 and a forwarding engine 108. Control unit 104 may comprise any combination of hardware and software that implement the techniques described in this disclosure. As mentioned above, control unit 104 may comprise one or more processors, Application Specific Integrated Circuits (ASICs), integrated circuits or any other processing or control unit or element or combination thereof, and a memory or storage device. In some instances, the memory or storage device (e.g., generally, a computer-readable storage medium) may comprise the above described instruction that cause the programmable processor to perform the techniques described herein.

Routing engine 106 may be substantially similar to routing engine 56 of FIG. 3 in that routing engine 106, although not shown in FIG. 6, may include modules and database similar to modules 58-63 and database 61 of routing engine 56 that perform the secure path selection techniques. Routing engine 106 may generally update routing information or link information stored within TE DB 107 to accurately reflect the topology of the network and other entities. TE DB 107 may be substantially similar to TE DB 59. Routing engine 106 may, as described above, determine or select a path based on security information received from other network security devices. In accordance with routing information stored in TE DB 59, forwarding engine 108 may maintain forwarding information within FIB 109 that associates network destinations with specific next hops and corresponding interfaces ports. FIB 109 may be substantially similar to FIB 54. Routing engine 106 may install the determined path in forwarding engine 108, such that forwarding engine 108 may maintain FIB 109 in this manner.

Router 102 further includes a set of interface cards (IFCs) 110A-110N ("IFCs 110") for communicating packets via inbound links 112A-112N ("inbound links 112") and outbound links 114A-114N ("outbound links 114") and a security card 118. Each of IFCs 110 couple to and communicate with control unit 104 via switch 116. Switch 116 may comprise any communication medium capable of communicatively coupling one or more endpoints, e.g., IFCs 110, control unit 104, and security card 118. Forwarding engine 108 may receive packet forwarded via switch 116 from IFCs 112 and forward those packets via switch 116 and IFCs 110 on outbound links 114A-114N according to forwarding information stored to FIB 109. In this manner, forwarding engine 108 provides the forwarding functionality of router 102. Security card 118 may be substantially similar to security card 50 of FIG. 3.

As described above, router 102 may receive the packets or more generally, network traffic, via incoming links 112, whereupon IFCs 110 forward those packets via switch 104 to forwarding engine 92. Forwarding engine 108 may maintain information requiring that packets associated with particular flows, as one example, should be first sent to service card 118 prior to forwarding those packets via one of outbound links 114.

Forwarding engine 108 may then forward these packets to security card 118 for processing or servicing in the manner described above. After servicing, security card 106 may forward the packets back to forwarding engine 108 via switch 116, whereupon forwarding engine 108 forwards the packets via one of outbound links 114 associated with the determined path.

Security card 118 may therefore comprise any card or other removable processing unit that may be inserted into a slot. Security card 118 may, once inserted into the slot, interface with switch 116, whereby security card 118 may receive, service (e.g., apply one or more security services) and forward packets. In this manner, any network device may implement the secure path selection techniques described herein to promote more efficient utilization of network security devices, decrease administrator oversight through automatic discovery of and routing to network security devices, and facilitate more comprehensive network security through layering of security services.

Various embodiments of the invention have been described. These and other embodiments are within the scope of the following claims.

The invention claimed is:
1. A method comprising:
  issuing, with a first router included within a network and in accordance with an inspection protocol, a communication to a network security device coupled to the first router requesting security information that describes at least one security service provided by the network security device, wherein the at least one security service comprises at least one of a firewall service, an anti-virus service, and an intrusion detection and prevention service;
  in response to the communication and in accordance with the inspection protocol, receiving, with the first router, a response communication that includes the security information from the network security device;
  generating, with the first router and in accordance with a routing protocol, a message that includes the security information;
  forwarding, with the first router and in accordance with the routing protocol, the message to at least a second router that is different from the first router;
  receiving, with a second router included within the network, the message including the security information;
  based on both topology information describing the network and the received security information, performing path selection with the second router to determine a path through the network that includes the first router so that the first router coupled to the network security device is positioned along the path between the second router and the destination, wherein the path includes a plurality of next hops from the second router to a destination, and wherein the network security device is not in the forwarding path for network traffic forwarded along the path; and
  forwarding, with the second router, at least a portion of the network traffic along the determined path to the first router along the path;
  redirecting, with the first router, at least the portion of the network traffic to the network security device to apply the at least one security service;
  receiving, with the first router and from the network security device, at least the portion of the network traffic remaining after applying the at least one security service; and forwarding, with the first router, at least the portion of the network traffic remaining after applying the at least one security service along the path to the destination.

2. The method of claim 1, wherein receiving the security information comprises receiving, in accordance with a link state protocol, a link state advertisement (LSA) from the second router that includes the security information.

3. The method of claim 1, further comprising:
determining adjacent security information for an adjacent network security device that couples to the second router; and
forwarding the adjacent security information to the first router.

4. The method of claim 3,
wherein determining the adjacent security information comprises inspecting the adjacent network security device in accordance with the inspection protocol to determine the adjacent security information, and
wherein forwarding the adjacent security information comprises forwarding the adjacent security information via a link state advertisement (LSA) in accordance with a link state protocol.

5. The method of claim 3, wherein the adjacent network security device that couples to the second router comprises a security card included within the second router.

6. The method of claim 1,
wherein the network security device comprises one of a plurality of network security devices,
wherein performing the path selection comprises:
receiving at least one policy associating the portion of the traffic with the security service provided by the one of the network security devices;
maintaining a table comprising a plurality of entries, wherein each entry stores the security information for a different one of the plurality of network security devices;
selecting at least one of the plurality of entries that stores the security information describing the service identified by the policy; and
determining, in accordance with an interior gateway protocol, the path through the network such that the path flows through the one of the plurality of network security devices associated with the selected entry.

7. The method of claim 6,
wherein the security information includes a utilization property indicating an availability of a corresponding one of the plurality of network security devices,
wherein selecting the at least one of the plurality of entries comprises:
selecting two of the plurality of entries corresponding to two different ones of the plurality of network security devices that each provides the same security service identified by the policy;
determining an availability for each of the two different one of the plurality of network security devices based on the utilization property included within the security information of the two entries; and
selecting one of the two different ones of the plurality of routers based on the determined availabilities to increase utilization of the plurality of network security devices.

8. The method of claim 1, wherein performing path selection to determine the path comprises determining the path in accordance with a link state protocol.

9. The method of claim 1, wherein performing path selection to determine the path comprises establishing the path in accordance with a Multi-Protocol Label Switching (MPLS) signaling protocol.

10. The method of claim 1,
wherein the network security device comprises a security card,
wherein the first router includes the security card, and
wherein the first router internally couples to the security card.

11. A router included within a network comprising:
one or more interfaces that receive, in accordance with a routing protocol, a message including security information that describes at least one security service provided by a network security device positioned within the network and that is retrieved by another router different from the router via a communication sent to the network security device requesting the security information and a response communication received from the network security device including the security information both in accordance with an inspection protocol, wherein the network security device is coupled to the other router, wherein the at least one security service comprises at least one of a firewall service, an anti-virus service, and an intrusion detection and prevention service; and
a control unit that, based on both topology information describing the network and the received security information, performs path selection to determine a path through the network that includes the other router so that the other router coupled to the network security device is positioned along the path between the router and the destination, wherein the path includes a plurality of next hops from the router to a destination, wherein the network security device is not in the forwarding path for network traffic forwarded along the path, and
wherein the one or more interfaces forward at least a portion of the network traffic along the determined path to the other router such that the other router 1) redirects at least the portion of the network traffic to the network security device coupled to the other router, receives from the network security device at least the portion of the network traffic remaining after applying the at least one security service, and 3) forwards at least the portion of the network traffic remaining after applying the at least one security service along the path to the destination.

12. The router of claim 11, wherein the one or more interfaces receive a link state advertisement (LSA) that includes the security information in accordance with a link state protocol from the other router.

13. The router of claim 11,
wherein the control unit includes a security module that determines adjacent security information for an adjacent network security device that couples to the router, and
wherein the one or more interfaces forward the adjacent security information to the second router.

14. The router of claim 13,
wherein the security module includes an inspection protocol module that implements an inspection protocol to inspect the adjacent network security device in accordance with the inspection protocol to determine the adjacent security information, and wherein the one or more interfaces forward the adjacent security information via a link state advertisement (LSA) in accordance with a link state protocol.

15. The router of claim 14,
wherein the adjacent network security device comprises a security card,
wherein the router includes the security card to apply one or more additional security services to the network traffic, and
wherein the one or more additional security services include one or more of an anti-virus (AV) security service, a firewall (FW) security service and an intrusion detection/prevention (IDP) security service.

16. The router of claim 11,
wherein the network security device comprises one of a plurality of network security devices,
wherein the control unit comprises:
a user interface module that presents a user interface with which an administrator may interact to input at least one policy associating the portion of the traffic with the security service provided by the one of the network security devices;
a security module that maintains a table comprising a plurality of entries, wherein each entry stores the security information for a different one of the plurality of network security devices, and selects at least one of the plurality of entries that stores the security information describing the service identified by the policy; and
an interior gateway protocol (IGP) module that determines, in accordance with an interior gateway protocol, the path through the network such that the path flows through the one of the plurality of network security devices associated with the selected entry.

17. The router of claim 16,
wherein the security information includes a utilization property indicating an availability of a corresponding one of the plurality of network security devices,
wherein the security module further selects, based on the security information, two of the plurality of entries corresponding to two different ones of the plurality of network security devices that each provides the same security service identified by the policy and determines an availability for each of the two different one of the plurality of network security devices based on the utilization property included within the security information of the two entries, and selects one of the two different ones of the plurality of routers based on the determined availabilities to increase utilization of the plurality of network security devices.

18. The router of claim 11, wherein the control unit includes an interior gateway protocol module that implements a link state Open Shortest Path First (OSPF) protocol to determine the path in accordance with the OSPF protocol.

19. The router of claim 11, wherein the control unit includes a Multi-Protocol Label Switching (MPLS) module that implements an MPLS signaling protocol and establishes the path in accordance with the MPLS signaling protocol.

20. The router of claim 11,
wherein the network security device comprises one of a firewall (FW) device or an intrusion detection/prevention (IDP) device that applies the security service,
wherein the security service comprises one of a FW security service, an IDP security service or an anti-virus (AV) security service.

21. The router of claim 11,
wherein the network security device comprises a security card, wherein the other router includes the security card, and
wherein the other router internally couples to the security card.

22. A network system comprising:
a plurality of network security devices; and
a plurality of routers that couple to one or more of the network security devices,
wherein a first one of the plurality of routers includes:
a control unit that generates, in accordance with an inspection protocol, a communication to one of the plurality of network security devices coupled to the first one of the plurality of routers requesting security information that describes at least one security service provided by the one of the plurality of network security devices, wherein the at least one security service comprises at least one of a firewall service, an anti-virus service, and an intrusion detection and prevention service; and
one or more interfaces that issue the communication to the one of the plurality of network security device, receive, in response to the communication and in accordance with the inspection protocol, a response communication that includes the security information from the network security device,
wherein the control unit of the first one of the plurality of routers generates, in accordance with a routing protocol, a message including the security information;
wherein the one or more interfaces of the first one of the plurality of routers forwards the message including the security information to at least a second one of the plurality of routers,
wherein the second one of the plurality of routers includes:
one or more interfaces that receives the message including the security information; and
a control unit that, based on both topology information describing the network and the received security information, performs path selection to determine a path through the network that includes the first one of the plurality of routers so that the first one of the plurality of routers coupled to the one of the network security devices is positioned along the path between the second one of the plurality of routers and the destination, wherein the network security device is not in the forwarding path for network traffic forwarded along the path, and
wherein the one or more interfaces of the second one of the plurality of routers forward at least a portion of the network traffic along the determined path to the first one of the plurality of routers,
wherein the one or more interfaces of the first one of the plurality of routers redirects at least the portion of the network traffic to the network security device to apply the at least one security service, receives at least the portion of the network traffic remaining after applying the at least one security service, and forwards at least the portion of the network traffic remaining after applying the at least one security service along the path to the destination.

23. The network system of claim 22, wherein the one or more interfaces of the second one of the plurality of routers receive one or more link state advertisements (LSAs) that include the security information in accordance with a link state protocol from each of the other routers.

24. The network system of claim 22,
wherein the control unit of the second one of the plurality of routers includes a security module that determines adjacent security information for at least one of the plurality of network security device adjacent to and that couples to the second one of the plurality of routers, and wherein the one or more interfaces of the second one of the plurality of routers forward the adjacent security information to each of the other routers.

25. The network system of claim 24, wherein the security module includes an inspection protocol module that implements an inspection protocol to inspect the adjacent network security device in accordance with the inspection protocol to determine the adjacent security information, and wherein the one or more interfaces of the second one of the plurality of routers forward the adjacent security information via an opaque link state advertisement (LSA) in accordance with a link state protocol.

26. The network system of claim 25, wherein the adjacent network security device comprises a security card, wherein the second one of the plurality of routers includes the security card to apply one or more additional security services to the network traffic, and wherein the one or more security services include one or more of an anti-virus (AV) security service, a firewall (FW) security service and an intrusion detection/prevention (IDP) security service.

27. The network system of claim 22, wherein the control unit of the second one of the plurality of routers comprises:

a user interface module that present a user interface with which an administrator may interact to input at least one policy associating the portion of the traffic with at least one of the security services provided by one of the network security devices;

a security module that maintains a table comprising a plurality of entries, wherein each entry stores the security information for a different one of the plurality of network security devices, and selects one of the plurality of entries that stores the security information describing the service identified by the policy; and an interior gateway protocol (IGP) module that determines, in accordance with an interior gateway protocol, the path through the network such that the path flows through the one or more of the plurality of network security devices associated with the selected entry.

28. The network system of claim 27, wherein the security information includes a utilization property indicating an availability of a corresponding one of the plurality of network security devices, wherein the security module further selects, based on the security information, two of the plurality of entries corresponding to two different ones of the plurality of network security devices that each provides the same security service identified by the policy and determines an availability for each of the two different one of the plurality of network security devices based on the utilization property included within the security information of the two entries, and selects one of the two different ones of the plurality of routers based on the determined availabilities to increase utilization of the plurality of network security devices.

29. The network system of claim 22, wherein the control unit of the second one of the plurality of routers includes an interior gateway protocol module that implements a link state Open Shortest Path First (OSPF) protocol to determine the path in accordance with the OSPF protocol.

30. The network system of claim 22, wherein the control unit of the second one of the plurality of routers includes a Multi-Protocol Label Switching (MPLS) protocol module that implements an MPLS signaling protocol and establishes the path in accordance with the MPLS signaling protocol.

31. The network system of claim 22, wherein each of the plurality of network security devices comprises one of a firewall (FW) device or an intrusion detection/prevention (IDP) device that applies the security service, wherein the security service comprises one of a FW security service, an IDP security service or an anti-virus (AV) security service.

32. The network system of claim 22, wherein one or more of the network security devices each comprises a security card, wherein one or more of the plurality of routers includes a corresponding one of the one or more security cards, and wherein one or more of the plurality of routers that include the corresponding one of the one or more security cards internally couples to the respective one of the one or more security cards.

33. A non-transitory computer-readable medium comprising instructions for causing a programmable processor to:

receive, with a first router included within a network and in accordance with a routing protocol, a message including security information that describes at least one security service provided by a network security device positioned within the network and that is retrieved by second router different from the first router via a communication sent to the network security device requesting the security information and a response communication received from the network security device including the security information both in accordance with an inspection protocol, wherein the network security device couples to a second router, wherein the at least one security service comprises at least one of a firewall service, an anti-virus service, and an intrusion detection and prevention service;

performing, based on both topology information describing the network and the received security information, path selection to determine a path through the network that includes the second router so that the second router coupled to the network security device is positioned along the path between the first router and the destination, wherein the path includes a plurality of next hops from the first network router to a destination, and wherein the first router selects the path through the network so that the second router coupled to the network security device is positioned along the path between the first router and the destination, wherein the network security device is not in the forwarding path for network traffic forwarded along the path; and forward, with the first router, at least a portion of the network traffic along the determined path to the second router such that the second router 1) redirects at least the portion of the network traffic to the network security device coupled to the other router, receives from the network security device at least the portion of the network traffic remaining after applying the at least one security service, and 3) forwards at least the portion of the network traffic remaining after applying the at least one security service along the path to the destination.

* * * * *